July 14, 1936.　　　W. W. INFIELD　　　2,047,687

TANK AND FILTER SYSTEM

Filed Nov. 20, 1935　　　2 Sheets-Sheet 1

INVENTOR
WILLIAM W. INFIELD

July 14, 1936.　　W. W. INFIELD　　2,047,687
TANK AND FILTER SYSTEM
Filed Nov. 20, 1935　　2 Sheets-Sheet 2
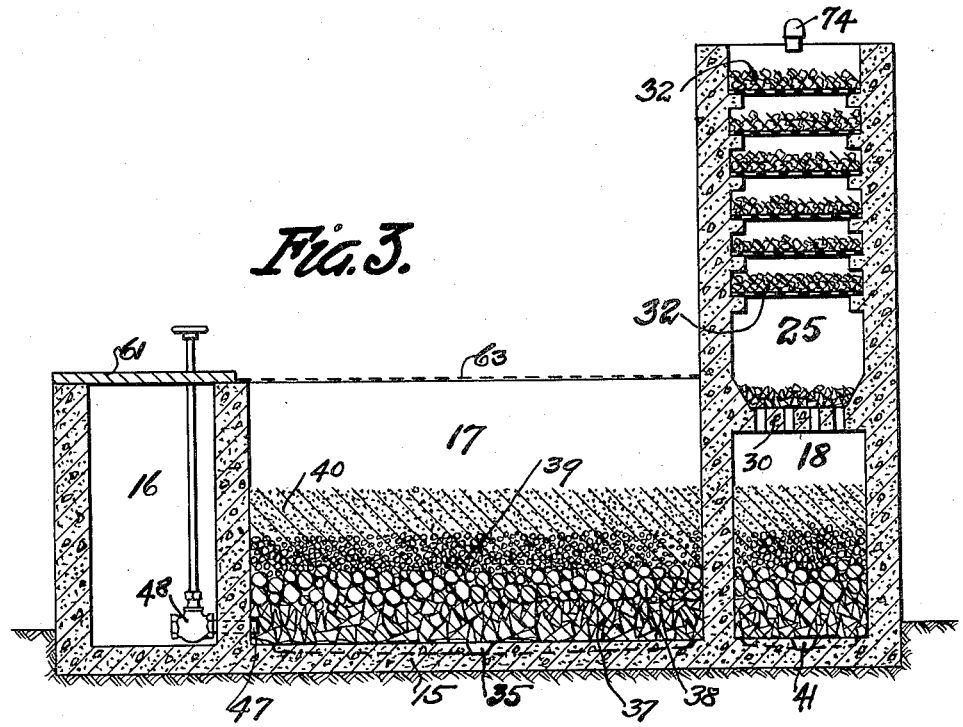
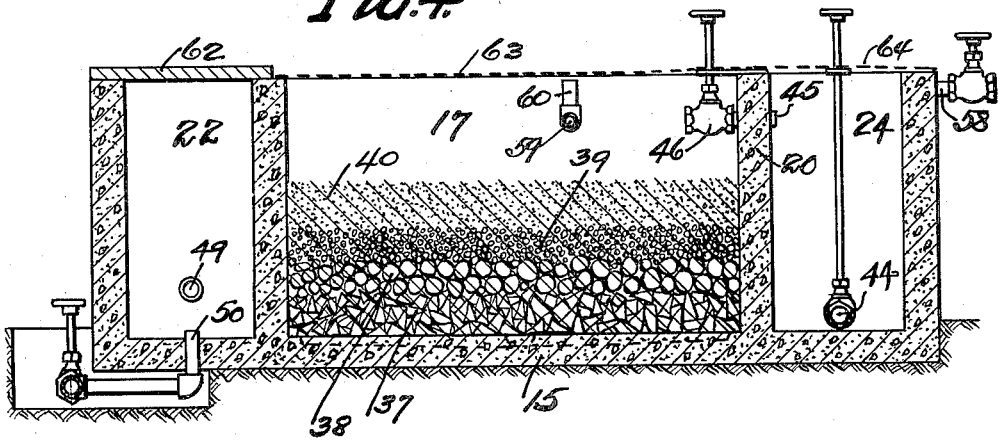
INVENTOR
WILLIAM W. INFIELD
By J. H. Weatherford
Atty.

Patented July 14, 1936

2,047,687

UNITED STATES PATENT OFFICE 2,047,687

TANK AND FILTER SYSTEM

William W. Infield, Memphis, Tenn.

Application November 20, 1935, Serial No. 50,648

2 Claims. (Cl. 210—26)

This invention relates to improvements in combined tank and filter systems and relates more particularly to systems of this kind in which the tank and filter are combined with a controlled pumping system for replenishing the tank supply.

The primary object of the invention is to provide an improved tank and filter and controlled pumping means for maintaining the level of the water supply within the tank.

A further object is to provide means whereby the filter may be efficiently washed either with raw or filtered water as may be deemed desirable; and A still further object is to provide means for automatically controlling the water supply to the tank and filter.

The means by which the foregoing and other objects are accomplished and the manner of their accomplishment will readily be understood from the following specification on reference to the accompanying drawings in which,—

Fig. 3 is a transverse sectional elevation taken as on the line III—III of Fig. 1, and Fig. 4 a corresponding sectional elevation taken as on the line IV—IV of Fig. 1.

Figure 1:
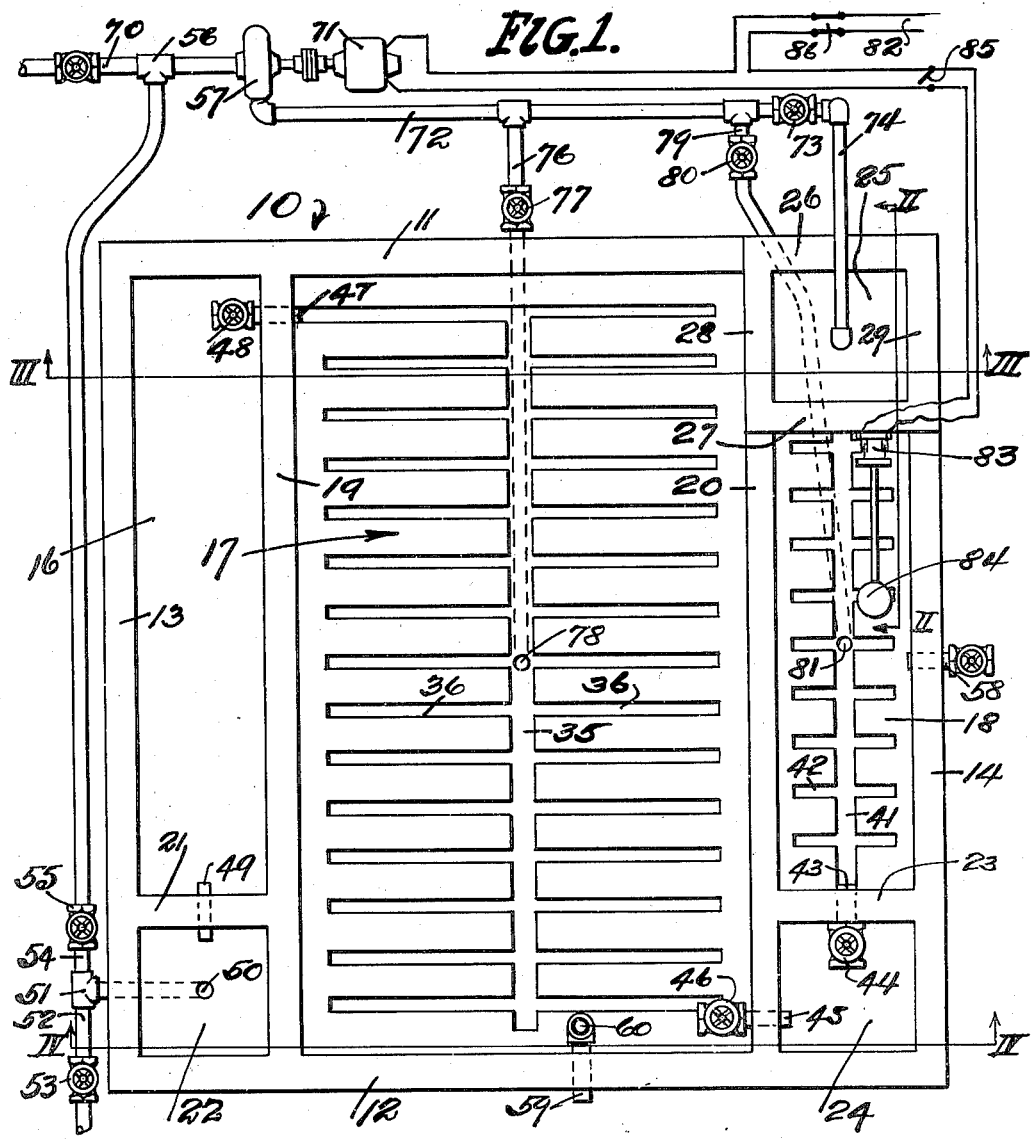
Fig. 1 is a plan view of the tank and filter with covers and filtering beds removed in order that the tank construction may more clearly be seen.
Figure 2:
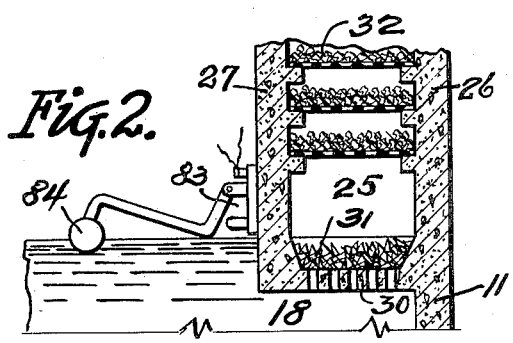
Fig. 2 is a fragmentary sectional elevation taken as on the line II—II of Fig. 1.

Referring now to the drawings in which the various parts are indicated by numerals, 10 is a tank, here shown as a square tank, having end walls 11, 12 and side walls 13, 14 all of equal height, and a bottom 15. This tank is divided into three major compartments 16, 17 and 18, by two walls 19, 20, both extending from one end wall 11 to the other end wall 12, these compartments respectively being a settling basin, a main filter basin and a primary filter basin, the main basin preferably being about double the combined size of both side basins. 21 is a transverse wall extending from the side wall 13 to the intermediate wall 19 and separating off from the settling basin 16 an additional compartment 22 which functions as a clear pool from which the filtered water is finally drawn. 23 is a transverse wall extending between the side wall 14 and the intermediate wall 20 separating off from the primary filter basin 18, an additional or transfer chamber 24. Supported on the end wall 11, side wall 14 and intermediate wall 20, and extending upwardly therefrom is an aerating chamber 25, having end walls 26, 27 and side walls 28, 29, the end wall 27 being supported by the intermediate wall 20 and side wall 14 and extending downwardly a minor distance only below the top thereof the major portion of the height of the primary filter basin 18 being uninterrupted so that this basin extends continuously from the end wall 11 to the transverse wall 23, and has one end below the aeration chamber.

The aeration chamber 25 has a perforated bottom 30, which is adapted to support a filter bed 31, preferably of broken lime stone, and thereabove are additional filter beds 32, which preferably are of coke.

The bottom of the main filter basin 17 is preferably provided with a longitudinal drain channel 35 and lateral drain channels 36 leading thereto. Disposed in the lower portion of this basin is a bed of coarse broken stone 37 preferably limestone, on which is disposed a layer of somewhat smaller, preferably rounded stone or gravel 38. The layer 38 supports a layer 39 of finer gravel or very coarse sand, on which is a top layer 40 of fine sand. A preferably identical series of layers of filtering materials is provided in the primary filtering basin 18, this basin being likewise provided with longitudinal and transverse drainage channels 41, 42.

The wall 23 separating the filter basin 18 and the transfer chamber 24 has an opening or pipe 43 therethrough adjacent the bottom of the basins, which opening is controlled by a valve 44. The transfer chamber and the main filter basin are connected adjacent their tops by an opening or pipe 45 through the wall 20, which opening is controlled by a valve 46. At the opposite end of the main filter basin 17, an opening or pipe 47 is provided through the wall 19 into the final settling basin 20, this opening being controlled by a valve 48. The settling basin 16 is connected by an opening or pipe 49 through the wall 21 with a clear pool 22, the opening 49 preferably being adjacent but spaced above the bottom of the basin and pool and not necessarily being controlled by a valve. A pipe 50 leads from the bottom of the clear pool to a T 51 from which a branch 52 controlled by a valve 53 leads to the point of final distribution of the filtered water, and a second branch 54 controlled by a valve 55 leads as through a T 56 to a pump 55.

The primary filter basin 18 is provided with a valve controlled over-flow 58 which is positioned adjacent the top of the basin. The main filter basin is provided with an over-flow 59 which over-flow has an upwardly extending nipple 60 the top of which is at the desired water level, this preferably being quite close to the top of the walls.

The settling basin 16 and the clear pool 22 are preferably closed by solid covers 61, 62, which may be a single continuous cover should it be so desired. 63 is a screen covering the top of the main filter basin and 64 a similar screen covering the primary filter basin and the transfer chamber 24.

It will be understood that all the chambers and basins described might be covered by solid covers or all might be covered by screens should it be so desired.

70 is a valve controlled intake pipe leading from a source of supply not shown, to the pump 57. 71 indicates an electric motor. 72 is the discharge pipe from the pump 57 through valve 73 and pipe 74 into the top of the aeration chamber 25. 76 is a branch of the discharge pipe 72 controlled by a valve 77 which branch leads beneath the main filter chamber and is adapted to discharge thereinto through the pipe 78. 79 is a similar branch controlled by a valve 80 and adapted to discharge through a pipe 81 into the bottom of the primary filter 18. 82 is a wiring circuit leading from a source of electric current (not shown) to the motor 71. One branch of this circuit leads through a float controlled switch 83 and back to the motor. The switch 83 is indicated as a knife switch controlled by the rise and fall of a float 84, the switch being open when the level of the water in the tank is adjacent the top thereof and closing when the water level drops. 85 is a switch by means of which the float controlled circuit may be cut off. 86 is a power circuit switch.

In using the device, the valves 55, 77 and 80 are closed, switch 85 is closed to cut off float control, the motor 71 is started and water is drawn through the valve controlled pipe 70 from a suitable source of supply and delivered into the top of the aeration chamber 25. This water passes downward through the coke filters 32, dropping from each thereof to the next below and being aerated in its passage. It passes thence through filter 31 and into the primary filter basin 18 in which it spreads out and slowly filters downward through the filtering material therein, and escapes through the valve 44 into the transfer chamber 24 in which it rises. From the chamber 24, the water passes through the pipe 45 into the main filter basin 17 spreading out over the top of the filter bed in such basin and filtering downward therethrough, being collected by the channel 35 and its branches 36. From the basin 17 water passes into the settling basin 16, and from this into the clear pool 22, from which it flows by gravity through the pipe 52 and valve 53 to the point of use. When the water builds up sufficiently in all of the chambers and basins, other than the aeration chamber, the float 84 rises, disconnecting the switch 83, and pumping ceases until such time as the water again drops sufficiently to close the switch and again start the motor.

Eventually the filters in the basin 17 and 18 may become clogged and it be desirable to wash them. This may be done by closing the valve 73, opening the valve 77 and pumping the water directly from the source of supply beneath the filter bed and forcing the wash water upward therethrough allowing the wash water to drain off through the overflow 59. During this washing process the valve 48 to the settling basin and the valve 46 leading to the transfer chamber are both closed. When washing has been satisfactorily completed in the main filter basin the valve 80 may be opened and the valve 77 closed and washing be similarly carried on in the primary filter basin, the overflow from such basin being allowed to escape through the valve controlled overflow pipe 58. During this operation the valve 44 is preferably closed. On completion of this primary washing, the valve on line 70 is closed, valve 53 is closed, valve 55 opened and water is drawn from the clear pool 22 and settling basin 16 to complete the washing of the primary filter basin and of the main filter basin. After washing has been completed valves 55, 77 and 80 are again closed, valves 44, 46, 48, 53 and 73 are opened and water is again drawn through the main suction line 70 from the source of supply, discharged into the aeration chamber and the system is again in operation.

It will be understood from the foregoing that an essential feature of the invention is the provision, in addition to the preliminary filtering and aeration means, of a settling and filtering compartment, or compartments, which are arranged to hold the water to be filtered as far as is possible in a quiet state above the level of the filtering materials, in order to allow sufficient time for perfect settling of all suspended matter on the top of the filtering sand; and preferably to provide and allow for the flooding of the water with sunlight or daylight, in order to destroy bacteria and water bearing germs, it being understood that if the bacteria is destroyed the germs will be starved out.

It will also be understood that flooding of the tanks with artificial light may also be resorted to should it be so desired. It will be seen that the automatic control of the pumping means for maintaining the level of the water supply within the tank and the replenishing of the supply as water is withdrawn for use, is of material assistance in carrying out these purposes.

It will be understood also that while the compartment walls are shown barely above the water level, the height of the walls thereabove may be increased should it be so desired.

I claim:
1. In a water filtering system, a tank divided into a main filtering basin, and two smaller basins on opposite sides of said main basin, one of said smaller basins being a primary filter basin and the other therefor a settling basin, an end portion of said primary filter basin being divided off to form a transfer chamber and an end portion of said settling basin being divided off to form a clear pool, an aeration chamber positioned above the end portion of said primary filter basin opposite from said transfer chamber; said primary filtering basin and said main filtering basin having each therein stratified layers of filtering material graduating upward from coarse to fine, the lower portion of said primary filtering basin being connected into said transfer chamber through a valve controlled opening, the upper portion of said transfer chamber being connected into said main filter basin through a valve controlled opening, the lower portion of said main filter basin being connected to said settling basin through a valve controlled opening, an uncontrolled opening connecting said settling basin and said clear pool, means for delivering water to the top of said aeration chamber and means for withdrawing water from the bottom of said clear pool.

2. In a water filtering system, a tank divided into a main filtering basin, and two smaller basins on opposite sides of said main basin, one of said smaller basins being a primary filter basin and the other therefor a settling basin, an end portion of said primary filter basin being divided off to form a transfer chamber and an end portion of said settling basin being divided off to form a clear pool, an aeration chamber positioned above the end portion of said primary filter basin opposite from said transfer chamber; said primary filtering basin and said main filtering basin having each therein stratified layers of filtering material graduating upward from coarse to fine, the lower portion of said primary filtering basin being connected into said transfer chamber through a valve controlled opening, the upper portion of said transfer chamber being connected into said main filter basin through a valve controlled opening, the lower portion of said main filter basin being connected to said settling basin through a valve controlled opening, an uncontrolled opening connecting said settling basin and said clear pool, a pump, a valve controlled pipe from said pump to the top of said aeration chamber, means for withdrawing water from said clear pool, a valve controlled pipe from said pump into the bottom of said main filtering basin, a valve controlled pipe from said pump to said primary filter basin, said valves being manually controllable to establish flow to said aeration chamber, or optionally to establish reverse flow to either or both of said filter basins.

WILLIAM W. INFIELD.